Oct. 18, 1932.     O. U. ZERK     1,883,283

LUBRICATING APPARATUS

Filed May 19, 1930     2 Sheets-Sheet 1

Inventor
Oscar U. Zerk
By Williams Bradbury
McCaleb & Hinkle
Attys.

Oct. 18, 1932.  O. U. ZERK  1,883,283
LUBRICATING APPARATUS
Filed May 19, 1930   2 Sheets-Sheet 2

Inventor
Oscar U. Zerk
By Williams Bradbury McCaleb & Hinkle
Attys.

Patented Oct. 18, 1932

1,883,283

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

LUBRICATING APPARATUS

Application filed May 19, 1930. Serial No. 453,498.

My invention relates to lubricating apparatus and more particularly to metering devices especially adapted for use in centralized lubricating systems. Centralized lubricating systems comprise, in general, a source of lubricant supply, a lubricant pump communicating therewith and fed therefrom, a branched conduit system connecting the pump with a plurality of bearings requiring lubrication, and metering devices in the branched conduits for apportioning the quantity of lubricant supplied by the pump among the various bearings.

An object of my invention is to provide a new and improved metering device particularly adapted to form part of a centralized lubricating system.

Another object is to provide a metering device which will continue to supply lubricant to its bearing after the cessation of pump pressure.

Another object is to provide a metering device which will supply lubricant to a bearing over a long period of time.

Another object is to provide a metering device which need be connected with a pump or other source of lubricant pressure for only a short period of time.

Another object is to provide a metering device which will accurately determine the quantity of lubricant supplied to its bearing.

Other objects and advantages will become apparent as the description proceeds.

In the drawings

Figure 1:
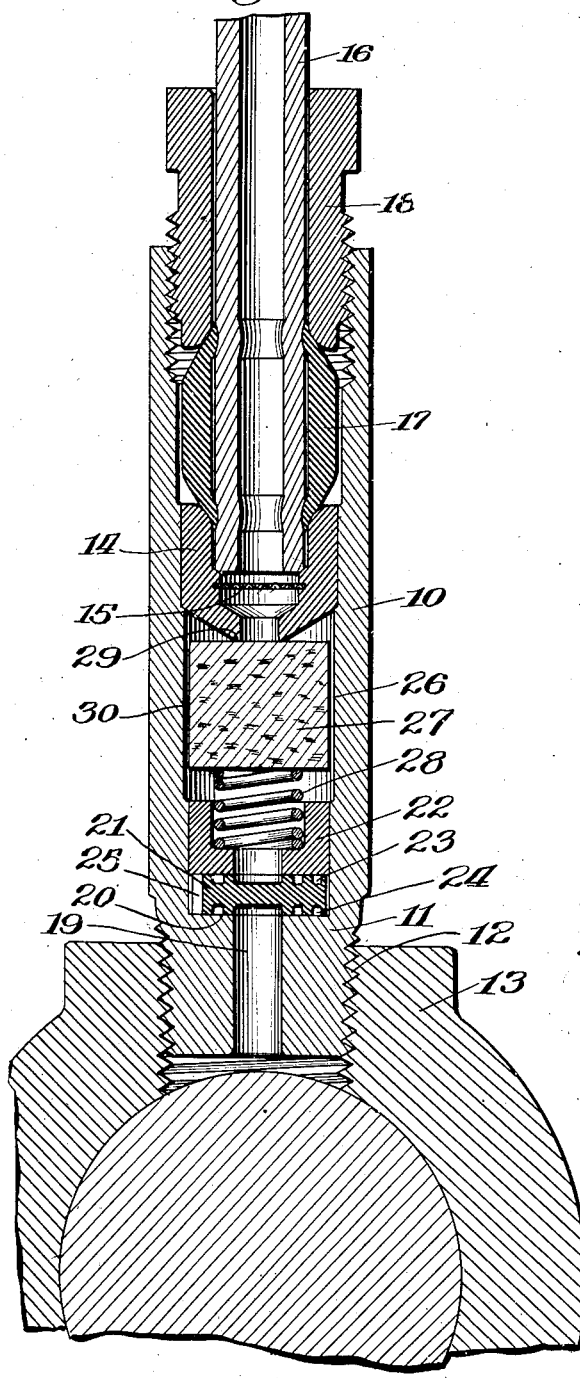
Figure 1 is a sectional elevation of one embodiment of my invention, showing the parts in one position.
Figure 2:
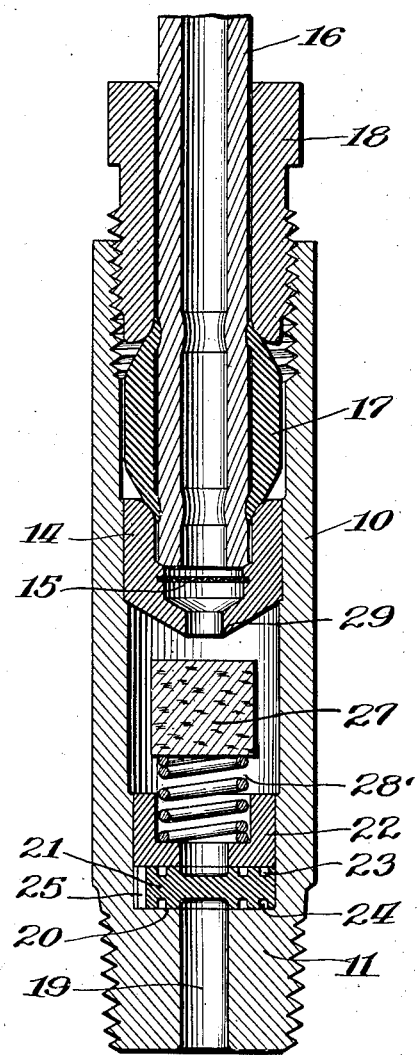
Figure 2 is a view similar to Figure 1 but showing the parts in a second position.

Referring, first, to the embodiment shown in Figures 1 and 2, I have illustrated my invention as comprising a tubular body 10 having a lower end 11 threaded, as indicated at 12, to facilitate attachment to a bearing 13. Approximately midway of the body 10 is located a tubular socket 14 carrying a strainer 15 of wire mesh or other suitable material. The tubular socket 14 is adapted to receive one end of a conduit 16 which serves to connect the body 10 with a lubricant pump or other source of lubricant supply. The conduit 16 is securely locked in place by a compression sleeve 17 confined between the socket 14 and a tubular nut 18 threaded into the upper end of the body 10 in a well known manner.

The end 11 is provided with a bore 19 terminating at an internal shoulder 20 which supports a resistance disc 21 securely held in place by a retaining sleeve 22 preferably press fitted into the body 10. The resistance disc 21 is provided with spiral grooves 23 and 24 which co-operate with the sleeve 22 and shoulder 20 to provide a small passageway which offers relatively high resistance to the flow of lubricant therethrough. I preferably connect the grooves 23 and 24 by means of a vertical groove 25 formed in the periphery of the disc 21, although in some instances it will be sufficient to use a disc of slightly smaller diameter than the chamber in which it is located, thus affording an annular space between the periphery of the disc and the wall of the chamber and the annular space thus provided will suffice to connect the spiral grooves 23 and 24. This type of resistance unit is claimed per se in my co-pending application, Serial No. 334,683, filed January 24, 1929, and in my present application I am only claiming this structure in combination with other novel features of my invention.

Between the socket 14 and the sleeve 22 is a chamber 26 which, with its contents, comprises what I prefer to call a pressure reservoir. In the chamber 26 is a large body of cork 27 which nearly fills the chamber and which is pressed by a spring 28 against a valve seat 29 formed by the lower end of the socket 14. The diameter of the cork 27 is smaller than the diameter of the chamber 26 thereby providing an annular space 30 between the periphery of the cork 27 and the wall of the chamber 26. This annular space 30 permits substantially free flow of lubricant past the cork 27.

The operation of my invention is as follows: Assuming that the parts are in the position shown in Figure 1 and that pressure is applied to the lubricant in the conduit 16, the cork 27 is first forced from the valve seat 29 thereby slightly compressing the relatively strong spring 28 and permitting lubricant to flow into the chamber 26. This inflow of lubricant quickly fills the chamber 26, whereupon the pressure in the conduit 16 tends to force lubricant to flow through the restricted passageway formed by the spiral grooves 23 and 24 in the disc 21. Since this passageway offers a high resistance to the passage of lubricant therethrough, only a small flow of lubricant is created in this restricted passageway and a pressure is built up in the chamber 26. This building up of pressure in the chamber 26 causes the cork 27 to shrink until it assumes substantially the size shown in Figure 2, the amount of shrinkage, of course, depending upon the pressure created in the chamber 26. I have found that a high quality of cork may be shrunk to one-fifth of its original size but this requires an unduly high pressure and for ordinary purposes the pressure created by the lubricant pump will shrink the cork to only approximately one-half of its original size, depending, of course, upon the degree of pressure created by the lubricant pump and the resistance to flow afforded by the restricted passageway between the chamber 26 and the bearing 13. With my improved metering device it is necessary to operate the lubricant pump for only a brief period of time and upon cessation of pump operation the cork 27 is moved upwardly by the spring 28 and into contact with the seat 29, whereupon reverse flow of lubricant from the chambers 28 to the conduit 16 is prevented. Thereafter the cork 27 slowly expands to its original size and during such expansion lubricant is displaced from the chamber 26 and forced into the restricted passageway to the bearing, thus continuing to supply lubricant to the bearing long after the cessation of pump operation.

In place of the disc 21 and its associated parts I may form a resistance passageway between a threaded plug and the internal wall of the body 10 as shown in my co-pending applications, Serial Nos. 158,155 and 207,609, filed December 31, 1926, and July 22, 1927, respectively.

Figure 3:
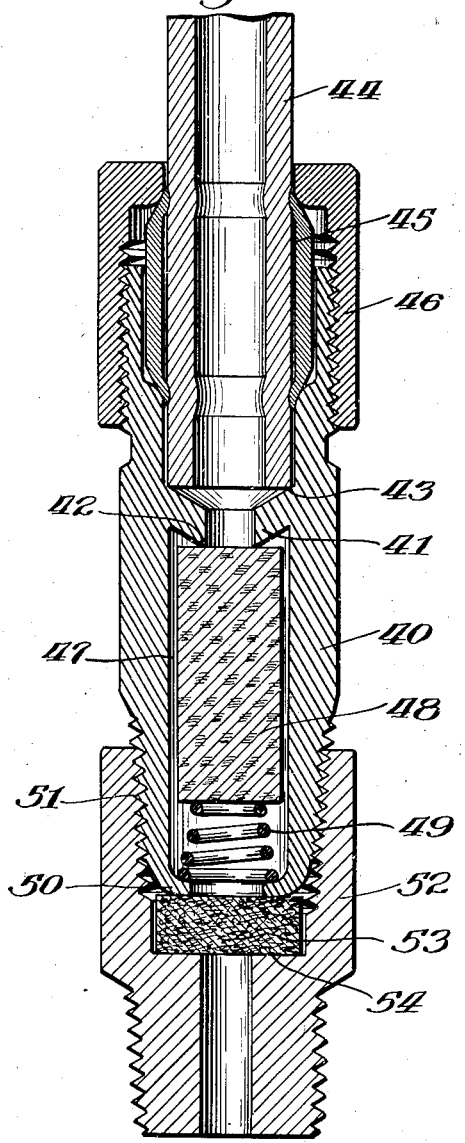
Figure 3 is a sectional elevation of a modified form of the invention.

In the modified form of the invention illustrated in Figure 3 the body 40 is provided with a reduced portion 41 affording a valve seat 42 and a shoulder 43 against which abuts the end of a conduit 44 securely held in place by a compression sleeve 45 confined between the body 40 and a terminal sleeve 46 threadedly engaging the upper end of the body 40. In this form of the invention the body 40 is relatively short and provides only a chamber 47 which, together with the cork 48 and spring 49, forms the pressure reservoir. The lower end of the body 40 is flanged inwardly, as indicated at 50, to form a seat for the spring 49, and this end of the body is threaded at 51 to facilitate attachment of the body 40 to a connecting member 52 which serves to secure the body to a bearing or other suitable support. A felt strainer and resistance disc 53 is confined between the flange 50 and an internal shoulder 54 formed in the connecting member 52. By using a hard packed felt disc a reasonably high resistance to the flow of lubricant therethrough may be secured, but this form of the invention is particularly adapted for use with bearings which require only a relatively low resistance so that the bearing itself affords substantially all of the resistance necessary and the felt disc 53 functions mainly or wholly as a filter. In this form of the invention I have used a larger cork which gives the same shrinkage with less pressure or a greater shrinkage with the same pressure. In case a very substantial resistance is offered to the discharge of lubricant to the bearing, the member 48 will be held substantially in place and will shrink uniformly when pressure is admitted, but in case the resistance to the bearing is materially reduced, the body 48 will be forced down suddenly and bulge slightly at the bottom to effect a momentary seal.

Figure 4:
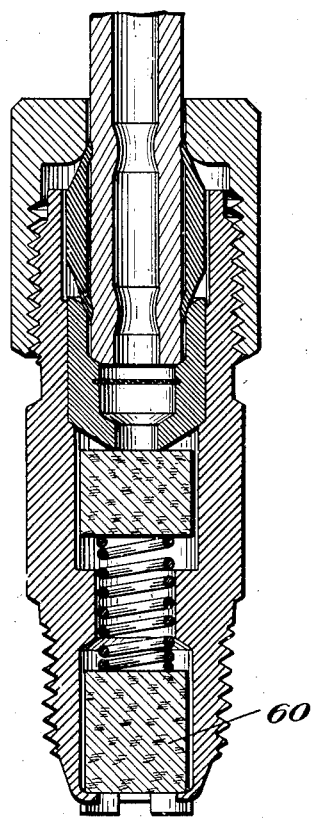
Figure 4 is a sectional elevation of a still further modification of the invention.

The form of the invention shown in Figure 4 is generally similar to that shown in Figures 1 and 2. In Figure 4, however, I substitute a second cork member 60 for the resistance disc 21 and its associated parts. The cork 60 is nearly as large as the chamber in which it is disposed, leaving only a small annular space between it and the walls of the chamber. In order to hold the block 60 in position alternate portions of the lower end of the body are bent over horizontally to form a seat while leaving the other alternate portions extending vertically to permit restrained passage of lubricant past the cork member 60 to the bearing. By making the member 60 of relatively hard cork which compresses but slightly under the pressure used, I can obtain a relatively cheap resistance passageway between the pressure reservoir and the bearing. This form of my invention, however, is particularly adapted for bearings offering high resistance and by making the member 60 of soft cork I increase the storage capacity of the device while at the same time offering sufficient resistance to flow of lubricant to the bearing to prevent flooding thereof.

It is to be understood that I am not limited to the exact forms of the invention shown in the drawings but that various changes and modifications may be made therein without departing from the scope of my invention which is limited only by the following claims.

Having thus illustrated and described certain preferred embodiments of my invention, what I claim and desire to secure by United States Letters Patent is:

1. In lubricating apparatus of the class described, the combination of a body member having one end threaded for attachment to a bearing, a tubular socket supported in said body member, a strainer carried by said socket, a resistance member mounted in said body and providing a restricted passageway offering high resistance to the flow of lubricant therethrough, a chamber formed between said socket and said resistance member, a large block of cork movably supported in said chamber, and a spring for pressing said block against said socket.

2. In lubricating apparatus of the class described, a metering device comprising a tubular member providing a chamber therein, said chamber having an inlet and provided with a valve seat, means for connecting said inlet end with a lubricant supply conduit, a block of cork in said chamber, a spring for urging said cork against said valve seat, means for attaching said tubular member to a bearing requiring lubrication, a conduit connecting said chamber with said bearing, and means in said conduit offering resistance to the flow of lubricant therethrough.

3. In lubricating apparatus of the class described, the combination of a tubular member having a chamber formed therein, said chamber having an inlet provided with a valve seat and an outlet, means for connecting said inlet with a lubricant supply conduit, means for connecting said outlet with a bearing requiring lubrication, a block of cork substantially filling said chamber and yieldingly engaging said valve seat when the latter is under atmospheric pressure, and means offering resistance to the flow of lubricant interposed between said chamber and said bearing.

4. In lubricating apparatus of the class described, the combination of a tubular body, means for connecting one end of said body with a lubricant supply conduit, means for connecting the other end of said body with a bearing requiring lubrication, a chamber formed in said body, a shrinkable resilient block located in said chamber, and resistance means interposed between said chamber and said bearing.

5. In lubricating apparatus of the class described, the combination of a body member having one end threaded for attachment to a bearing, a tubular socket supported in said body member, a strainer carried by said socket, a resistance member mounted in said body and providing a restricted passageway offering high resistance to the flow of lubricant therethrough, a chamber formed between said socket and said resistance member, a resilient compressible body of uniform material movably supported in said chamber, and a spring for pressing said body against said socket.

6. In lubricating apparatus of the class described, a member providing a chamber, said chamber having an inlet and an outlet, means for connecting said inlet with a source of lubricant supply, a compressible resilient body located in said chamber, a conduit connecting said outlet with a bearing requiring lubrication, and a member partially blocking said conduit, said member being compressible upon increase of pressure and sufficiently resilient to return to its original size upon dissipation of said pressure.

In witness whereof, I hereunto subscribe my name this 14th day of May, 1930.

OSCAR U. ZERK.